(12) United States Patent
Schwartz et al.

(10) Patent No.: US 7,240,519 B2
(45) Date of Patent: Jul. 10, 2007

(54) APPARATUS AND METHOD FOR BENDING GLASS SHEETS

(75) Inventors: James H. Schwartz, Gibsonia, PA (US); Mark M. Savka, Sewickley, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 592 days.

(21) Appl. No.: 10/706,884

(22) Filed: Nov. 12, 2003

(65) Prior Publication Data

US 2004/0226318 A1 Nov. 18, 2004

Related U.S. Application Data

(60) Provisional application No. 60/427,116, filed on Nov. 18, 2002, provisional application No. 60/438,877, filed on Jan. 9, 2003.

(51) Int. Cl.
*C03B 23/035* (2006.01)

(52) U.S. Cl. ............... 65/104; 65/106; 65/107; 65/287; 65/289; 65/290; 65/291

(58) Field of Classification Search .......... 65/273, 65/106, 287, 104, 289, 107, 291, 268, 290
See application file for complete search history.

(56) References Cited

U.S. PATENT DOCUMENTS 3,600,150 A 8/1971 Rougeux .......... 65/268
4,265,650 A 5/1981 Reese et al. .......... 65/104
4,285,715 A * 8/1981 Frank .......... 65/106
4,859,225 A 8/1989 Kuster et al. .......... 65/104
4,983,205 A 1/1991 Kuster et al. .......... 65/290
5,992,178 A 11/1999 Kuster .......... 65/24

FOREIGN PATENT DOCUMENTS

DE 37 15 151 11/1988
EP 0 838 438 4/1998
WO 93/01140 1/1993

OTHER PUBLICATIONS

International Search Report mailed May 14, 2004.
U.S. Appl. No. 60/438,877, filed Jan. 9, 2003.

* cited by examiner

*Primary Examiner*—Carlos Lopez
(74) *Attorney, Agent, or Firm*—Andrew C. Siminerio (57) ABSTRACT

An apparatus for shaping heat softened glass sheets includes an upper mold having a full surface press face with a shaping surface generally contoured to the desired curvature of the sheets; a support device to support the sheets below the upper mold; a shaping rail having an upper sheet supporting surface that supports selected peripheral portions of the sheets, the sheet supporting surface having a profile corresponding to desired elevational contours of the selected peripheral portions of the sheets and complimenting corresponding portions of the upper mold shaping surface; a chamber positioned below the sheets; a moving device for moving the upper mold and the shaping rail relative to each other so as to press at least a periphery of the sheets against the upper mold shaping surface, and a connector to direct pressurized gas into the chamber to urge the sheets towards the upper mold press face.

29 Claims, 4 Drawing Sheets

FIG. 2

APPARATUS AND METHOD FOR BENDING GLASS SHEETS

This application claims the benefit of U.S. Provisional Application No. 60/427,116 filed Nov. 18, 2002 and U.S. Provisional Application No. 60/438,877 filed Jan. 9, 2003.

BACKGROUND OF THE INVENTION

The present invention relates to shaping of glass sheets to be laminated, and in particular relates to the simultaneous shaping of a pair of glass sheets by a combination of gravity sag bending, press bending and static air pressure.

The desire of automotive designers to have windshields with more complicated bends and deeper sags and the requirement that the windshield conform to a predetermined surface profile over its entire extent places demands on the glass fabricator to produce more difficult shaped glass parts with more stringent tolerances. Such complicated shapes are desired for vehicle styling purposes and are required to enable the shaped glass sheets to be mounted in a curved mounting frame forming part of an automobile body so that the curved glass forms a laminated window that merges with the shape of the curved mounting frame in the vehicle body in which it is mounted.

It would be advantageous to provide an arrangement for shaping glass sheets to such complicated shapes while minimizing marking of the glass sheets during the bending and shaping operation.

SUMMARY OF THE INVENTION

The present invention provides an apparatus for shaping at least one heat softened glass sheet comprising: an upper mold comprising a full surface press face having a shaping surface generally contoured to the desired curvature of at least one preliminary shaped glass sheet; a support device to support the at least one glass sheet below the upper mold; a shaping rail having an upper glass sheet supporting surface that supports selected peripheral portions of the at least one glass sheet, the sheet supporting surface having a profile generally corresponding to desired elevational contours of the selected peripheral portions of the at least one glass sheet and generally complimenting corresponding portions of the upper mold shaping surface; a chamber positioned below the at least one glass sheet; a moving device to move the upper mold and the shaping rail relative to each other so as to press at least a periphery of the at least one glass sheet against the upper mold shaping surface, and a connector to direct pressurized gas into the chamber to urge at least central portions of the at least one glass sheet towards the upper mold press face.

The present invention also provides a method of shaping at least one heat softened glass sheet comprising: supporting at least one preliminary shaped heat softened glass sheet at least about its periphery; aligning the at least one sheet between an upper mold comprising a full surface press face having a shaping surface generally contoured to a desired curvature of the at least one glass sheet and lower shaping rails comprising an upper glass sheet supporting surface that supports selected peripheral portions of the at least one glass sheet, the sheet supporting surface having a profile generally corresponding to the desired elevational contours of the periphery of the at least one glass sheet and generally complementing corresponding portions of the upper mold; moving the lower shaping rails and the upper mold relative to each other such that the selected peripheral portions of the at least one glass sheet are pressed between the lower shaping rails supporting surface and corresponding portions of the lower shaping surface of the upper mold; positioning a chamber below the at least one glass sheet; sealing the chamber; and pressurizing the chamber to bias at least central portions of the sheet against the upper mold to shape the at least one glass sheet to the desired configuration. In one nonlimiting embodiment of the invention,

BRIEF DESCRIPTION OF THE DRAWINGS

FIG. 1 comprising FIGS. 1A and 1B is a longitudinal side view of a glass sheet bending leer arrangement in accordance with the present invention.

DETAILED DESCRIPTION OF THE INVENTION

The present invention relates to shaping heat softened glass sheets, and in particular to simultaneous shaping a stacked pair of glass sheets, or doublets, for a windshield but it is understood that the invention can be used to shape any number of sheets of any heat softenable sheet material where it is desired that the sheets be precisely and accurately shaped and marking of the sheets due to shaping be minimized.

As used herein, spatial or directional terms, such as "inner", "outer", "left", "right", "up", "down", "horizontal", "vertical", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, and all subranges in between, e.g. 1 to 6.3, or 5.5 to 10, or 2.7 to 6.1. Also, as used herein, terms such as "positioned on" or "supported on" mean positioned or supported on but not necessarily in direct surface contact with. For example, a glass sheet "positioned on" a shaping rail does not preclude the presence of one or more other materials located between the sheet and the surface of the rail.

Figure 1A:
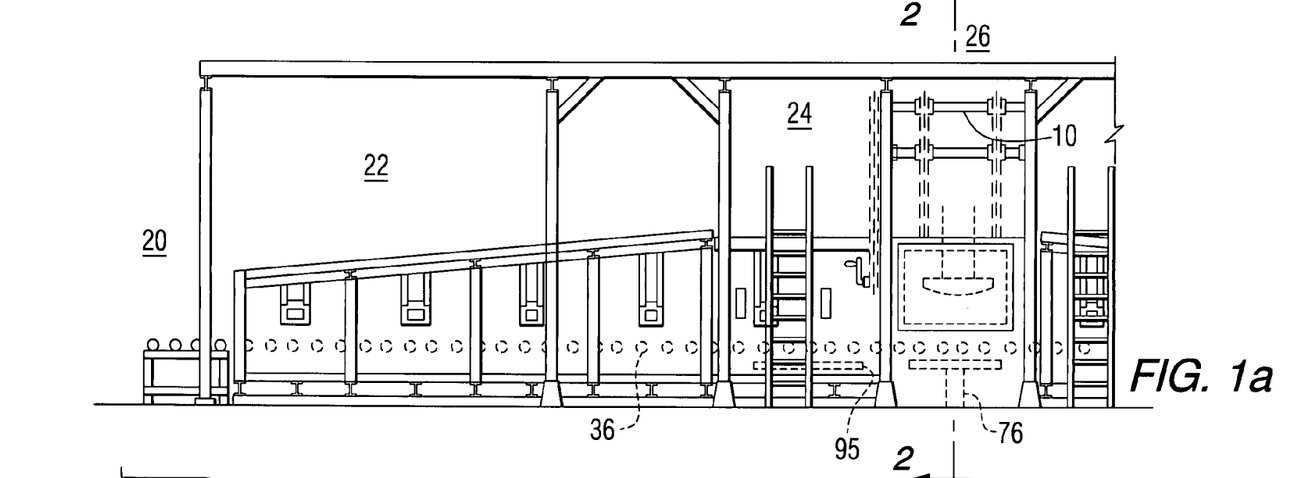
FIG. 1A shows the upstream portion and FIG. 1B downs the downstream section.
Figure 1B:
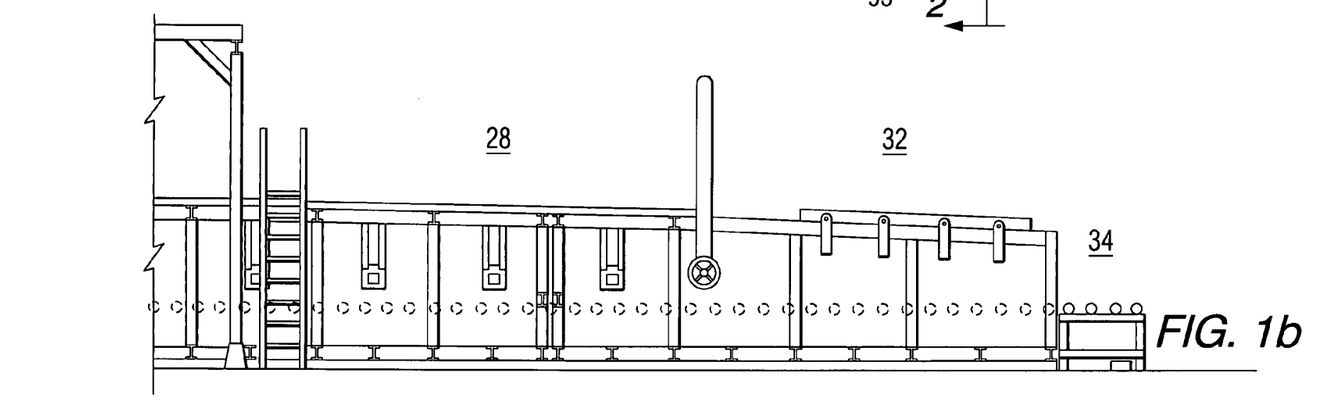

FIGS. 1A and 1B depict a heating, shaping and annealing lehr for shaping glass sheets according to the present invention. The lehr begins upstream at a loading zone 20 and includes a heating zone 22 of tunnel type configuration, a gravity bending zone 24 downstream of the heating zone 22, a press bending or shaping station 26 immediately beyond the gravity bending zone 24, an annealing zone 28 which can include a door 30 beyond the shaping station 26 and a cooling zone 32 in end to end relation in the downstream portion of the lehr. An unloading portion 34 is beyond the cooling zone 32. It should be appreciated that the present invention is not limited to the particular type of lehr discussed above and can be used in combination with other types of lehr, e.g. box-type lehrs, wherein a plurality of separate containers or boxes, each enclosing supported glass sheets, that proceed through the lehr in a stop-and-go arrangement, as is well know in the art.

Figure 2:
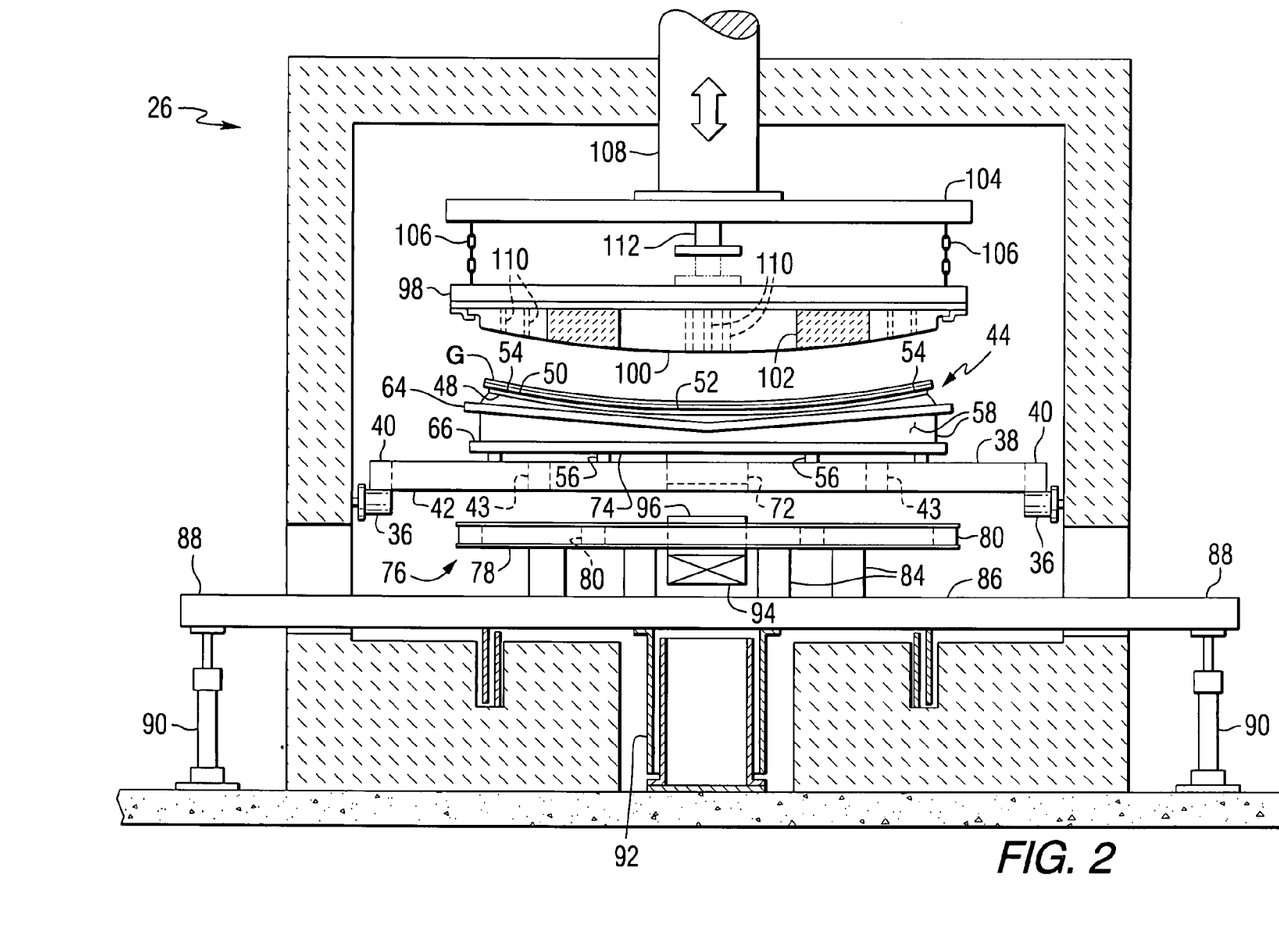
FIG. 2 is a view taken along line 2—2 of FIG. 1 showing a transverse elevation of the press bending station of the lehr arrangement shown in FIG. 1 which incorporates features of the present invention and includes a lower outline mold depicted in its lowered position and a full surface upper mold.

Referring to FIGS. 1 and 2, a conveyor comprising a plurality of pairs of stub rolls 36 disposed in transversely opposing, longitudinally spaced relation, extend the entire length of the lehr and define a path of movement along the longitudinal reference line. Each stub roll 36 is mounted on a shaft (not shown) that extends through a sidewall of the lehr and is connected to a conveyor drive (not shown). A mold return conveyor (not shown) extends along the entire lehr. The conveyor can be divided into a number of sections driven by their own drive means through a conventional drive rod and gear means or chain drives or the conveyor sections can be driven from a common drive through clutches in a manner well known in the art. A plurality of mold support carriages 38 (only one shown in FIG. 2) are conveyed along the conveyor by rotational engagement of the stub rolls 36 with longitudinally extending support rails 40 positioned along each side of the carriage 38. Transversely extending supports 42 (only one shown in FIG. 2) interconnect the support rails 40 and provide support for lower mold support members, as will be discussed latter. Additional longitudinally extending supports 43 extending between supports 42 provide additional support of carriage 38.

With continued reference to FIG. 2, an outline mold 44 is mounted on the carriage 38. The mold 44 includes shaping rail 48 having a supporting surface 50 that conforms an elevation and outline to the longitudinal and transverse elevational shape desired for the glass sheets G to be bent, slightly inboard of the glass sheet perimeter. The mold 44 illustrated in FIG. 2 has a continuous, fixed shaping rail, i.e. a continuous central portion 52 and end portions 54. However, if desired the mold 44 can be an articulating outline mold (not shown) and include a stationary central portion and a pair of opposed pivoting end mold wing sections, as is well known in the art. The outline mold 44 is positioned relative to the carriage 38 so that the mold's geometric center is generally aligned with the geometric center of an upper shaping mold when carriage 38 is aligned in the press bending station 26 and the outline mold 44 occupies a pressing position, as will be discussed later in more detail. In the non limiting embodiment of the invention shown in FIG. 2, mold 44 is supported and secured to carriage 38 via a plurality of cross members 56 extending between transverse supports 42 of carriage 38. Outline mold 44 is secured to members 56 in any convenient manner.

Figures 3, 6:
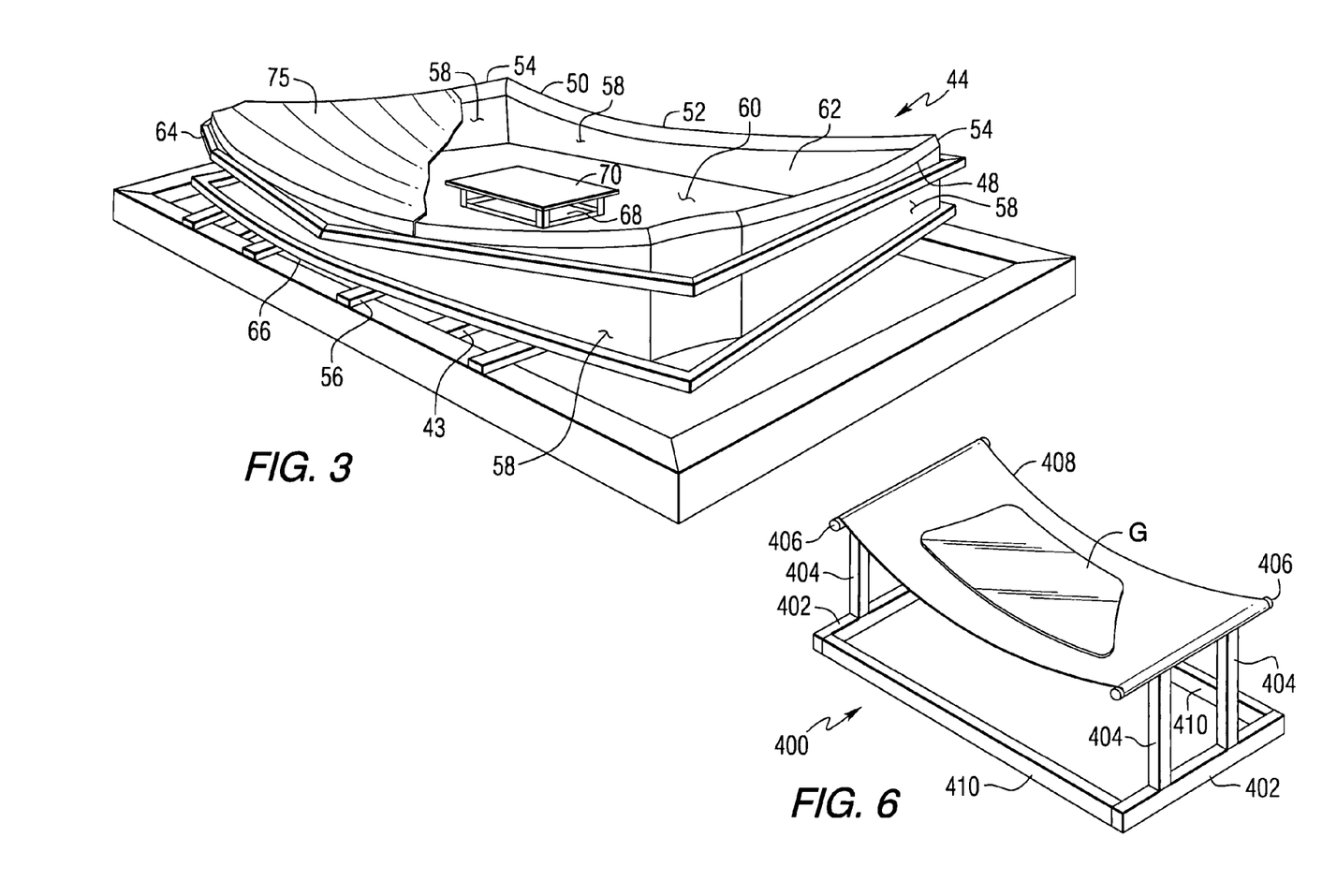
FIG. 3 is a perspective view of one non limiting embodiment of a lower outline mold incorporating features of the present invention.
FIG. 6 is a perspective view of another non limiting glass sheet support and conveying device incorporating features of the present invention.

Referring to FIGS. 2 and 3, the outline mold 44 includes a chamber or plenum positioned within the periphery of the shaping rails 48. In one non limiting embodiment of the invention, outline mold 44 includes sidewalls 58 and a lower wall 60 (shown only in FIG. 3), which form chamber 62 that is pressurized during the glass sheet press bending operation, as will be discussed later in more detail. In particular, sidewalls 58 extend from shaping rail 48 downward to lower wall 60. If desired, the sidewalls 58 can be integral with the shaping rail 48. Sidewalls 58 and lower wall 60 are formed from material that will allow for sufficient pressurization of chamber 62. Without limiting the present invention, in one embodiment the shaping rail 48 is formed from ⅛ inch stainless steel bar and the sidewalls 58 are formed from ⅛ inch stainless steel sheet welded to the rails. In another non limiting embodiment, the rails and sidewalls are integral and formed from ⅛ inch stainless steel sheet, with the upper edge of each sidewall 58 cut, folded or otherwise formed to provide the desired elevational contours of shaping rail 48. In still another non limiting embodiment, the sidewalls and lower wall are formed by one or more layers of flexible, heat resistant cloth. One or more of the layers cloth can be a non-permeable material. As an alternative, the materials can be air permeable provided that the combination of layers provides a sufficiently dense barrier to the air so that a desired pressure can be maintained within the cloth-lined chamber, as will discussed later in more detail.

In the non limiting embodiment of the invention shown in FIGS. 2 and 3, the sidewalls 58 of chamber 62 of mold 44 are supported and reinforced by upper ring frame 64 and lower ring frame 66. Upper frame 64 extends about the periphery of the mold chamber 62, is positioned between the shaping rail 48 and lower frame 66 and is secured to sidewalls 58. Lower frame 66 extends about the base of chamber 62 of mold 44. In one non limiting embodiment of the invention, mold 44 is secured to frame 66 through lower wall 60 of chamber 62 and frame 66 is secured to support members 56.

With continued reference to FIGS. 2 and 3, lower wall 60 includes an opening 68 through which heated gas enters chamber 62 and is pressurized during the glass sheet pressing operation. Although not limiting in the present invention, in the embodiment shown in FIGS. 2 and 3, a baffle plate 70 is positioned above and spaced from opening 68 so that the gas entering the chamber 62 during the pressing operation will not directly impact the downwardly facing lower surface of the heat softened glass sheets G supported on mold 44. A gasket assembly 72 (shown only in FIG. 2) is positioned along the lower surface 74 of lower wall 60 at opening 68 so that a source of heated gas can interface and seal with the chamber 62, as will be discussed later in more detail. In one non limiting embodiment of the invention, the gasket assembly 72 is formed from a ⅛ inch thick piece of Fiberfrax paper #970, commercially available from McNeil Inc., Robbinsville, N.J., sandwiched between two layers of stainless steel foil.

The support surface 50 of the shaping rails 48 is covered with one or more layers of soft, heat-resistant, flexible fabric that does not mark the hot glass sheets G while supported on mold 44 or during the press bending operation, as will be discussed later in more detail. Fabric 75 further provides a compliant support between the glass sheets G and support surface 50 of rails 48 to form a gasket or seal that limits, and in one nonlimiting embodiment prevents, pressurized gas from exiting chamber 62 during shaping operation, as will be discussed. Fabric 75 also provides an insulating surface between the glass sheets G and supporting surface 50 of rails 48 to slow the rate of conductive heat transfer between them. The fabric is wrapped around and secured to the sidewalls 58 to ensure that the support surface 50 is fully covered. In one nonlimiting embodiment, rather than simply covering the support surface 50, the fabric extends across the entire open upper portion of chamber 62. More particularly and referring to FIG. 3, fabric 75 extends across the chamber 62 between rails 48 and supports portions of the glass sheets within the shaping rails 48. The fabric 75 can be pulled taut or be allowed to sag into the chamber 62. Although not limiting in the present invention, in one nonlimiting embodiment fabric 75 includes two layers of fiberglass press cloth #S-1NS7L90062301 commercially available from GlassTech, Perrysburg, Ohio, sandwiched between two layers of stainless steel knitted press cloth #3KN/C3 commercially available from Bekaert Fibre Technologies, Marietta, Ga., stretched across the open upper end of the chamber 62.

Referring to FIG. 2, the press bending station 26 also includes a lifting frame 76. Frame 76 is positioned between and below stub rolls 36 and, in the particular embodiment shown in FIG. 2, has a grid-like configuration with a plurality of interconnected transversely extending beams 78 (one shown in FIG. 2) and longitudinally extending beams 80. Although not required, the openings in the frame between the beams can be filled with insulation (not shown). Frame 76 is secured to a series of posts 84 that are mounted to a lifting beam 86 positioned below frame 76. Although not limiting in the present invention, in the particular embodiment shown in FIG. 2, opposing ends 88 of beam 86 extend outside the press bending station 26 and are mounted on lifters 90 that raise and lower beam 86, which in turn engages and raises and lowers carriage 38 and lower outline mold 44 during the press bending operation and move them between a first position, wherein the lower mold 44 is spaced from an upper mold (as discussed later), and a second position, wherein the lower mold 44 is adjacent the upper mold such that a supported glass sheet is pressed against the upper mold, as will be discussed later in more detail. The vertical movement of lifting beam 86 is directed by guides 92. Without limiting the present invention, lifters 90 can be a ball screw, hydraulic cylinder, or other type of linear actuator.

In the nonlimiting embodiment shown in FIG. 2, also incorporated into lifting frame 76 is a flexible connector 94 that will contact gasket assembly 72 of outline mold 44 during the press bending operation. Connector 94 includes a collar 96 that is configured in a manner such that when the lifting frame 76 is lifted by beam 86 and engages carriage 38 to lift it off the stub rolls 36, collar 96 and gasket assembly 72 contact and form a seal.

Connector 94 is connected to a heated gas source that supplies pressurized heated gas to the chamber 62 during the glass sheet press bending operation. Although not limiting in the present invention, the connector 94 can be connected to a series of air supply ducts 95 positioned within the heating lehr. During the glass sheet press bending operation, fans (not shown) can be used to force heated air within the ducts into the chamber 62 and establish the desired static pressure within the chamber 62. It should be appreciated that as a result of the lower mold 44 configuration, the pressure within chamber 62 provides a generally uniform force over the entire downwardly facing glass sheet surface forming the upper portion of the chamber.

Referring to FIG. 2, the press bending station 26 also includes an upper pressing mold 98 comprising a lower press face 100. Although not limiting in the present invention, the press face 100 can be, for example, metal or ceramic. The press face 100 covers a continuous area whose outline is slightly larger than the outline of the glass sheets G to be shaped that are supported on the lower mold 44. The downwardly facing press face 100 of the upper mold 98 is generally concave downward in elevation across the width of the lehr to conform to the longitudinal component of bend and defines the desired glass surface contour about the periphery of the glass sheets G as well as the desired contours of the central region of the glass sheets G. Depending on the complexity of the shape to be imparted to the glass sheets G to be shaped, the press face 100 can further include an S-shaped bend component in elevation in the direction of the length of the lehr to conform to a desired transverse component of bend.

The press face 100 can be covered with one or more layers of heat resistant fabric 102 that do not mark the hot glass sheets G during the press bending operation. Although not limiting in the present invention, in one nonlimiting embodiment, the press face 100 is covered with one layer of fiberglass press cloth #S-1NS7L90062301 commercially available from GlassTech, Perrysburg, Ohio, covered by one layer of stainless steel knitted press cloth #3KN/C3 commercially available from Bekaert Fibre Technologies, Marietta, Ga.

In the nonlimiting embodiment of the invention shown in FIG. 2, the upper mold 98 is suspended at the press bending station 26 from a support plate 104 by chains 106 and the deadweight of the mold is used to press the glass sheets G, as will be discussed later. The mold 98 is positioned such that its geometric center is generally vertically aligned with the geometric center of the outline mold 44 when carriage 38 is positioned within the shaping station 26. Alignment pins or other well known type of alignment arrangement well known in the art are used to position the upper mold 98 relative to the outline mold 44 during the pressing operation. Plate 104 is mounted to piston 108 that is used to move the upper mold 98 between a raised position, wherein the upper mold 98 and lower mold 44 are spaced apart from each other, and a lower position, wherein the upper mold 98 and lower mold 44 are adjacent each other and press the glass sheets G therebetween. Although not limiting in the present embodiment, piston 108 can also be used to provide a positive downward force to the upper press 98 so that the pressing of the glass sheets is performed by a combination of the mold deadweight and the additional force applied by piston 108.

Cycle of Operation

In one nonlimiting embodiment of the invention, a pair of glass sheets G of curved outline and with suitable parting material therebetween is positioned in a substantially horizontal orientation on the shaping rail 48 of lower outline mold 44 supported by carriage 38 at the loading zone 20. The area within the shaping rails 48 can be open or fabric 75 can span between the rails 48 as discussed earlier. The carriage 38 is transversely aligned relative to a longitudinal reference line through the lehr by positioning rails 40 of carriage 38 on stub rolls 36 of the lehr. The carriage 38 passes through the heating zone 22 of the lehr, where the heating elements are arranged to provide a pattern of heating both longitudinally and transversely of the path of travel for the lower mold 44 through the lehr. By the time the mold 44 arrives at press bending station 26 (maintained at an ambient temperature range of 1080° F. to 1150° F. [582° C. to 621° C.]), the glass sheets G have been heated to their deformation temperature (typically 1070° F. to 1125° F. [577° C. to 607° C.]) and sag by gravity to a preliminary configuration, with the periphery of the glass sheets G generally conforming to the elevational contours of rail surface 50. In the embodiment of the invention wherein mold 44 is an articulating mold, the end mold wing sections will have pivoted upward by the time the mold 44 enters the press bending station 26.

During the passage of the outline mold 44 from the loading zone 20 to the pressing station 26, it may lose its proper alignment in orientation with respect to the longitudinal reference line. However, because the glass sheets generally have non-rectangular outlines of non-uniform curvature in plan and are bent to complicated shapes, it is essential that the outline mold 44 with the preliminary shaped sheets G be oriented and aligned below the lower press face 100 of the upper mold 98 when they arrive at the press bending station 26. Upon arrival at the press bending station 26, the support carriage 38 with the mold 44 positioned thereon is repositioned, if required, to generally align the geometric center of outline mold 44 and preliminary shaped glass sheets G below the upper press face 100, which is in its raised position. Various types of alignment systems (not shown) well known in the art can be used to align the carriage 38 within press bending station 26 and properly position the outline mold 44 relative to the upper mold 98. Limit switches (not shown) can be used to assure that the pressing operation will not continue unless the carriage 38 is properly positioned and aligned at the press bending station 26.

After mold 44 with the glass sheets G supported thereon is properly aligned, lifters 90 move lifting frame 76 upward and into engagement with carriage 38. At this time, collar 96 engages gasket assembly 72, sealing flexible connector 94 to chamber 62 of the lower outline mold 44. Lifters 90 continue to raise carriage 38, lifting carriage 38 off stub rolls 36 toward lower press face 100 of upper mold 98. As the lower mold 44 is lifted, piston 108 lowers upper mold 98. As the lower mold 44 approaches upper mold 98, alignment pins or other equivalent devices as are well known in the art, orient suspended upper mold 98 with the lower mold 44, such that their geometric centers are aligned. Lower mold 44 and upper mold 98 continue to move relative to each other until at least the peripheral portion of the glass sheets G is pressed between shaping rail 48 and a corresponding portion of press face 100 of upper mold 98 so that the periphery of the glass sheets G are formed to the desired elevational configuration and a seal is formed with chamber 62 about the glass sheet's peripheral edge. It should be appreciated that the fabric 75 on the lower mold 44 and fabric 102 on upper mold 98 will allow some sliding motion of the glass sheet G during shaping and in particular about the periphery of the glass sheets G which is pressed between the shaping rail 48 and corresponding portion of the upper mold 98.

After the seal is formed about the periphery of the glass sheets G, the fans are activated to direct the heated air with the air supply ducts into chamber 62 and establish a static pressure therein. This pressure serves to urge those central portions of the glass sheet G not contacted by the lower mold 44 against the press face 100 of the upper mold 98. As a result, the glass sheets G conform to the contour of press face 100 while not physically contacting the major portions of the glass sheets' downwardly facing major surface so that marking the lower glass surface in the central portion of the glass sheets is eliminated. The amount of pressure within chamber 62 can be controlled to provide the desired static pressure. The maximum pressure established within the chamber 62 is determined by the number and size of the fans, the weight of the upper mold 98 and the amount of additional load applied to the upper mold 98. More specifically, in one nonlimiting embodiment of the present invention wherein no additional load is applied to the upper mold 98, the static pressure is maintained below a level that would lift the glass sheets G and upper mold 98 off the shaping rails 48 and release the peripheral seal. However, it should be appreciated that a greater pressure can be applied within chamber 62 if an actuator, e.g. piston 112 extending from plate 104 or some other locking arrangement, operated to prevent upper mold 98 from being lifted off lower mold 44 as chamber 62 is pressurized. Furthermore, by applying even greater pressure to the upper mold 98 through pistons 108 and/or 112, the level of pressure within the chamber can be further increased. In one nonlimiting embodiment of the invention, the static pressure established within chamber 62 is no greater than 1.5 pounds per square inch (psi), for example, no greater than 1 psi, or no greater than 0.75 psi. A timer (not shown) is actuated to hold the lower mold 44 in position and maintain pressure within chamber 62 to insure the imposition of the desired curve configuration. The timer also controls the start of the return of the lower mold 44, lifting frame 76 and lifting beam 86 to their to lowered position.

During the pressing operation, as the glass sheets,G are biased upward toward the upper press face 100, the air between the glass sheets G and the upper mold 98 must have a path to exit from between the mold and sheets. In one nonlimiting embodiment of the invention, the air moves laterally through the fabric 102. In another nonlimiting embodiment, a series of holes 110 are provided through the press face 100 of upper mold 98 to provide the air an avenue of escape during pressing and shaping. These holes 110 can also be used to assist in separating the glass sheets G from the press face 100 as the upper and lower molds move apart after the press bending operation by providing a path through which air can enter the space. More specifically, during the pressing operation, the glass sheets G are pressed against the press face 100 of the upper mold 98. After pressing, a vacuum is created between the glass sheets G and press face 100 of mold 98. Holes 110 will allow air to enter between the glass sheets G and the upper mold press face 100 and relieve any vacuum that may have formed. If desired, pressurized air can be passed through the holes to relieve the vacuum and "blow" the glass sheets off fabric 102 covering press face 100 after shaping. This would be advantageous when the upper major surface of the glass sheets G contacting the fabric 102 includes a ceramic paint border or other decorative pattern and the paint tended to stick to the fabric 102. The air blown through holes 110 would help separate the glass sheets G from the fabric 102.

Although not required, the holes 110 can be controllably opened and closed to assist in the shaping of the glass sheets G. For example and without limiting the present invention, in one nonlimiting embodiment the holes 110 can be opened while chamber 62 is pressurized to allow air to more readily escape from between sheets G and upper press face 100. The holes 110 can then be sealed for a predetermined time so that any vacuum formed between the glass sheets G and press face 100 is maintained in order to ensure correct shaping of the glass sheets G. The holes 110 can then be opened to relieve the vacuum and allow the glass sheets G to remain on the lower mold 44.

After shaping the sheets G between the upper mold 98 and lower mold 44, the lower mold 44, lifting frame 76 and lifting beam 86 are lowered and carriage 38 is redeposited on stub roll 36. Similarly, the upper mold is raised to its initial position by piston 108. As discussed above, holes 110 can be utilized to help separate the glass sheets G from the fabric 102. In addition, in one nonlimiting embodiment of the invention, a relief valve (not shown) can be positioned to vent the pressurized air from chamber 62 after the shaping is complete. Alternately, stopping the fans should equalize the air pressure within the chamber 62.

When lower mold 44 is redeposited on stub rolls 36, the lehr door 30 opens and the stub rolls 36 are activated to convey the shaped glass sheets G and mold 44 out of the shaping station 26 and into the annealing zone 28. Door 30 is then closed for the next bending and shaping cycle.

It should be appreciated that the nonlimiting embodiment of the invention discussed above avoids applying the pressing load to the stub rolls 36. More specifically, by using a lifting frame 76 to lift the carriage 38 off stub rolls 36, the load applied to the lower mold 44 by upper mold 98 (and optionally piston 108) during pressing is transferred to the lifting beam 86 and lifters 90 rather than the stub rolls 36.

Once the glass sheets have been shaped in the pressing station 26, it is necessary that they retain their conforming shapes in the annealing zone 28 until cooled from within the deformation temperature range to below the strain point of the glass, which for float glass is approximately 950° F. (510°C.). The maximum rate of cooling that avoids excessive permanent warpage between the glass sheets G depends on, among other factors, the glass sheet thickness. After annealing, the glass sheets pass into a cooling zone 32 for additional cooling.

Although not required, the gas directed into chamber 62 during the embodiment of the pressing operation discussed herein is heated so as to avoid any thermal shock to the glass sheets resulting from contacting them with gas at a temperature below that which it was exposed to prior to heating. Furthermore, in one nonlimiting embodiment, the pressurized gas temperature can be used to cool the glass sheets G to their non-heat deformable state. In one nonlimiting embodiment of the present invention, the gas is heated to at temperature of 371° C. to 621° C. (700° F. to 1150° F.).

Although not required, it is contemplated that the upper mold of the present invention can incorporate a vacuum to assist with the shaping of the glass sheets. More particularly, air can be drawn through the press face 100 while in the glass sheets G are in contact with the upper mold 98, in a manner well know to those skilled in the art, to urge the glass sheets G against the press face 100 so that the sheets G conform to the its elevational contours. After shaping, the vacuum is terminated and the glass sheets G are separated from the upper mold 98 and lowered as discussed earlier.

It should be appreciated that the movement of the upper and lower molds can be modified to provide other bending sequences. For example and without limiting the present invention, upper mold 98 can remain stationary and lifters 90 can be used to move the glass sheets G upward a sufficient distance to press the glass sheets G between the lower mold 44 and upper mold 98. In another nonlimiting alternative embodiment, piston 108 can be used to move the upper mold 98 downward a sufficient distance to press the glass sheets G between the upper mold 98 and lower mold 44 while the lower mold 44 remains on the stub rolls 36. Connector 94 would be raised so as to engage collar 94 with gasket assembly 72 and allow the chamber 62 to be pressurized. Although not required, in this latter embodiment, posts or other auxiliary supports devices (not shown) can be used to support the lower mold 44 so that as upper mold 98 is lowered onto and pressed into the lower mold 44, the resulting load is not supported by the stub rolls 36 but rather by the auxiliary supports.

In the embodiment of the invention discussed above, the chamber 62 is formed by sidewalls 58 and lower wall 60, all of which are incorporated into the outline mold 44. In another nonlimiting embodiment of the invention, the lower wall is an independent element that is moved into engagement with the sidewalls during the pressing operation to form the chamber. More particularly, outline mold 44 includes sidewalls 58 but lower wall 60 is incorporated into the lifting frame 76. The bracing supports 43 of carriage 38 and cross members of mold 44 are repositioned so as to allow lower wall 60 to contact the lower edge of the sidewalls 58. Any type of convenient sealing arrangement can be used to seal the lower wall 60 against the lower edge of the sidewalls. For example, the lower edge of the sidewalls can be covered with a piece of Fiberfrax paper #970, sandwiched between two layers of stainless steel foil. In operation, the glass sheets G are heated and sagged by gravity to a preliminary configuration on a lower mold 44 having shaping rails 48 and sidewall 58. After the mold 44 is properly aligned below the upper mold 98, lifters 90 move lifting frame 76 upward into engagement with carriage 38 and move lower wall 60 into engagement with the lower edge of sidewalls 58 to form chamber 62. Lifters 90 continue to raise carriage 38, lifting carriage 38 off stub rolls 36 toward lower press face 100 of upper mold 98. The pressing operation then proceeds as discussed above. After the pressing is complete, the carriage 38 and lifting frame 76 are lowered back to their original position and the lower wall 60 is separated from the lower edge of the sidewalls 58. Lower wall 60 would include opening 68 to provide an inlet for the heated gas as discussed earlier. As an alternative to having a flexible connector engage the gasket assembly 72 at opening 68 to provide the heated gas into the chamber, the flexible connector 94 can be secured to the lower wall 60 and move with the lower wall 60 during the pressing operation.

Figure 4:
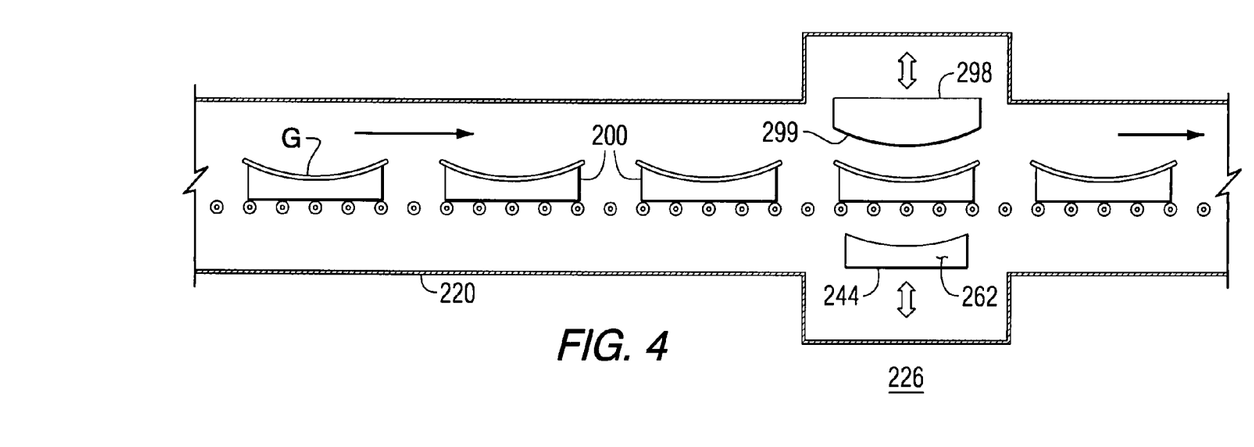
FIGS. 4 and 5 are schematic plan views of alternate non limiting embodiments glass sheet shaping arrangements, incorporating features of the present invention.

In the present invention as discussed above, the glass sheets G are supported, preliminary sag bent, pressed to shape, and cooled while supported on lower mold 44. It should be appreciated that other conveying and transfer arrangements can be used to move the glass sheets G into and out of the shaping station 26. For example and without limiting the present invention, the glass sheets G can initially be preliminary shaped on outline mold 200 of a type well know in the art, as shown in FIG. 4. After passing through heating lehr 220, the outline mold 200 and preliminary shaped glass sheets G then enter a shaping station 226 and are aligned under an upper mold 298 similar to upper mold 98 discussed herein. Next, a lower mold 244, similar to lower mold 44 discussed herein, is moved upwardly through the outline mold 200 to lift the glass sheets G off the outline mold 200 and press the glass sheets G against the press face 299 of upper mold 298, e.g. as disclosed in U.S. Pat. No. 4,265,650 to Reese, et al., which teachings are incorporated by reference. Chamber 262 of the lower mold 244, which is sealed against the lower surface of the glass sheets G, is then pressurized to complete the glass sheet shaping. After shaping, the lower mold 244 moves downward, through outline mold 200 and depositing the shaped glass sheets G on the outline mold. The outline mold 200 then exits the shaping station 226 as discussed above and the shaped glass sheets G are cooled.

Figure 5:
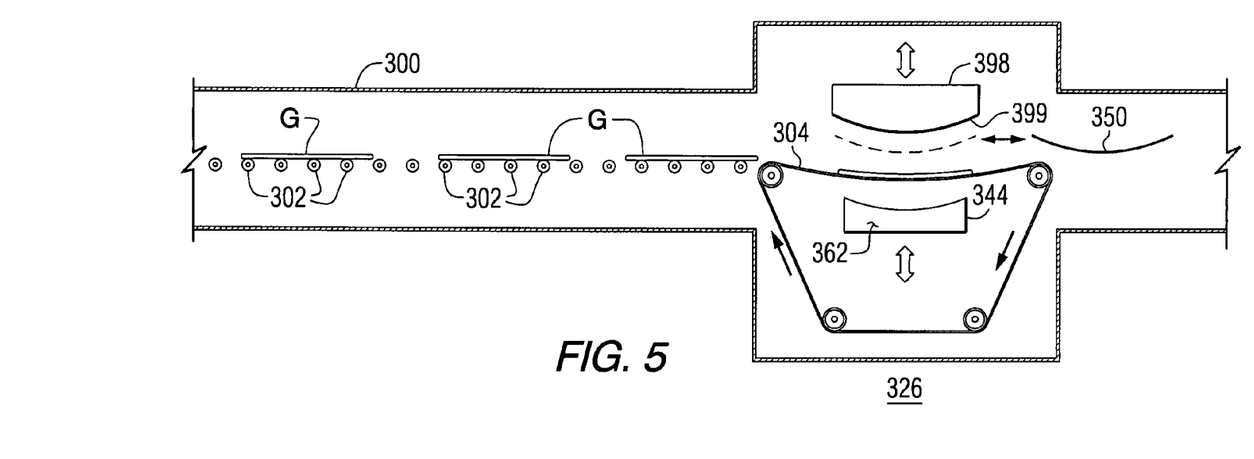

In another nonlimiting embodiment of the invention shown in FIG. 5, single or stacked glass sheets G are conveyed through a furnace 300 on a series of conveyor rolls 302. When the heat softened glass sheets reach the shaping station 326, the sheets are transferred onto a heat resistant, flexible conveying surface 304, which positions the sheets between an upper mold 398, similar to upper mold 98 discussed herein, and a lower mold 344, similar to lower outline mold 44 discussed herein. When properly positioned, the molds 398 and 344 move relative to each other to press the heat softened glass sheets therebetween. Chamber 362 in lower mold 344 is pressurized to complete the glass sheet shaping. A vacuum is then drawn along the press face 399 of the upper mold 398 to hold the shaped glass sheets G thereagainst as an annealing ring 350 is positioned under the glass sheets. The vacuum in the upper mold 398 is terminated and the glass sheets G are deposited on the annealing ring 350, which in turn exits the shaping station 326 and supports the glass sheets G as they are cooled in a manner as discussed earlier.

FIG. 6 illustrates a glass sheet support and conveying device that can be used in combination with the glass sheet heating and shaping system discussed herein. More specifically, frame 400 includes a pair of rails 402 that are conveyed along stub rolls 38, in a manner similar to rails 40 of frame 38. One or more posts 404 are mounted on rail 402 and support a fabric support member 406. A flexible, heat resistant fabric 408, similar to the fabrics discussed earlier, extends between the members 406 to provide a hammock arrangement that supports the glass sheets G. Cross members 410 interconnect rails 402 and reinforce the frame 400. The glass sheets are shaped in a manner similar to that discussed earlier for FIG. 4. More specifically, the glass sheets G are positioned on fabric 408 and frame 400 is conveying through a heating lehr. As the glass sheets G soften, they begin to sag on the fabric 408. When the frame and glass sheets G reach the bending station, the frame is aligned between an upper mold and lower mold of the types discussed earlier. The molds then move relative to each other to press the supported preliminary shaped glass sheets between them, using the pressurized chamber of the lower mold to ensure that the central portions of the glass sheets G are biased against the press face of the upper mold. After shaping, the glass sheets G can remain on the frame or be transferred to an annealing ring for cooling. It should be appreciated that with this type of arrangement, it is not necessary to cover the lower mold with a pressing fabric since the glass sheets G are already support on a flexible, heat resistant fabric that the lower mold must press through during the pressing operation.

The form of the invention shown and described in this disclosure represents an illustrative embodiment thereof. It is understood that various changes may be made without departing from the teachings of the invention defined by the claimed subject matter that follows.

What is claimed is:

1. An apparatus for shaping at least one heat softened glass sheet comprising:
   an upper mold comprising a full surface press face having a shaping surface generally contoured to the desired curvature of at least one preliminarily shaped glass sheet;
   a support device comprising a lower mold comprising a shaping rail and sidewalls extending downwardly from the shaping rail, the shaping rail comprising an upper glass sheet supporting surface that supports selected peripheral portions of the at least one glass sheet, the sheet supporting surface having a profile generally corresponding to desired elevational contours of the selected peripheral portions of the at least one glass sheet and generally complimenting corresponding portions of the upper mold shaping surface;
   a chamber positioned below the shaping rail;
   a moving device to move the upper mold and the lower mold relative to each other so as to press at least a periphery of the at least one glass sheet against the upper mold shaping surface, wherein the moving device comprises a lifting frame to move the lower mold between a first position and a second position, the lifting frame having a lower wall, wherein when the lower mold is at the first position, the lower wall is spaced from lower edges of the sidewall of the lower mold and the lower mold is spaced from the upper mold, and when the lower mold is at the second position, the lower wall is positioned against the lower edges of the sidewall of the lower mold to form the chamber and the lower mold is adjacent the upper mold such that the selected peripheral portions of the at least one glass sheet are pressed between the shaping rail of the lower mold and the corresponding portions of the upper mold, and
   a connector to direct pressurized gas into the chamber at least when the lower mold is in the second position to urge at least central portions of the at least one glass sheet towards the upper mold press face.

2. The apparatus as in claim 1, wherein the support device further comprises a flexible heat resistant fabric extending between the shaping rails.

3. The apparatus as in claim 2, wherein the connector directs pressurized gas into the chamber to establish a static pressure within the chamber.

4. The apparatus as in claim 3, wherein the lower wall of the lower mold includes an inlet and gasket assembly, the lifting frame includes the connector, and the connector includes a collar configured to engage the gasket assembly when the lifting frame is in the second position.

5. The apparatus as in claim 3, further including an upper mold reciprocating device which moves the upper mold between a raised position, wherein the upper mold is spaced from the lower mold, and a lowered position, wherein the upper mold is adjacent the lower mold such that the selected peripheral portions of the at least one glass sheet are pressed between the shaping rail of the lower mold and the corresponding portions of the upper mold.

6. The apparatus as in claim 3, wherein the at least one glass sheet comprises a stacked pair of glass sheets.

7. The apparatus as in claim 1, wherein the support device further comprises a heat resistant flexible carrier positioned on a support frame, and the chamber is positioned below the flexible carrier.

8. The apparatus as in claim 7, wherein the flexible carrier is a heat resistant, flexible conveying surface which supports the at least one glass sheet and allows the at least one glass sheet to sag downward to the preliminary shape.

9. The apparatus as in claim 1, wherein the upper mold, support device, and chamber are positioned within a heated enclosure.

10. The apparatus as in claim 9, further comprising a heated gas source to supply pressurized heated gas to the chamber.

11. The apparatus as in claim 10, wherein the heated gas source comprises at least one duct positioned within the heated enclosure.

12. The apparatus as in claim 1, wherein the at least one glass sheet comprises a stacked pair of glass sheets.

13. The apparatus as in claim 1, wherein the upper mold is an upper vacuum mold.

14. The apparatus as in claim 1, further comprising an upper mold reciprocating device to move the upper mold between a raised position, wherein the upper mold is spaced from the lower mold, and a lowered position, wherein the upper mold is adjacent the lower mold and the selected peripheral portions of the at least one glass sheet are pressed between the upper mold and corresponding portions of the support device.

15. The apparatus as in claim 1, wherein the connector is secured to the lower wall.

16. The apparatus as in claim 2, wherein the fabric is selected from fiber glass cloth and stainless steel cloth and combinations thereof, and the sidewalls and the lower wall are selected from sheet metal and heat resistant cloth and combinations thereof.

17. A method of shaping at least one heat softened glass sheet comprising:

supporting at least one preliminarily shaped heat softened glass sheet about its periphery on upper glass sheet supporting surface of shaping rails of a lower mold, the sheet supporting surface having a profile generally corresponding to the desired elevational contours of the periphery of the at least one preliminary shaped heat softened a glass sheet and generally complementing corresponding portions of an upper mold comprising a full surface press face having a shaping surface generally contoured to a desired curvature of the at least one glass sheet, wherein the upper glass sheet supporting surface supports selected peripheral portions of the at least one glass sheet;

moving the upper mold and the lower mold relative to one another to align the at least one glass sheet between the upper mold and the lower mold and to press selected peripheral portions of the at least one glass sheet between the lower shaping rails supporting surface and corresponding portions of the lower shaping surface of the upper mold;

providing the lower mold with sidewalls extending downwardly from the shaping rails and a lower wall to form a chamber below the at least one a lass sheet, and pressurizing the chamber to bias at least central portions of the sheet against the upper mold to shape the at least one glass sheet to the desired configuration, wherein moving the lower shaping rails and upper mold to press the selected portions of the at least one glass sheet therebetween generally seals the chamber.

18. The method as in claim 17, further comprising spanning between the shaping rails of the lower mold with an upper deformable member spanning to support at least central portions of the at least one glass sheet, and pressuring the chamber biases the at least central portions of the at least one sheet supported on the deformable member against the upper mold.

19. The method as in claim 17, wherein moving comprises moving at least the lower mold between a first position, wherein the at least one glass sheet is spaced from the upper mold, to a second position, wherein at least the selected peripheral portions of the at least one glass sheet are pressed against the upper mold.

20. The method as in claim 17, wherein moving comprises moving at least the upper mold between a raised position, wherein the upper mold is spaced from the at least one glass sheet, to a lower position, wherein at least the selected peripheral portions of the at least one glass sheet are pressed against the upper mold.

21. The method as in claim 17, further comprising supporting the lower mold on conveying rolls and lifting the lower mold off the conveying rolls before pressing the at least one glass sheet against the upper mold.

22. The method as in claim 17, wherein the lower wall is movable between a first position, wherein the lower wall is spaced from lower edges of the sidewall of the lower mold, and a second position, wherein the lower wall contacts the lower edges of the sidewalls and forms the chamber.

23. The method as in claim 17, wherein the chamber includes the shaping rail.

24. The method as in claim 23, wherein the moving the upper mold and the lower mold comprises conveying the at least one glass sheet over a plurality of conveying rolls while heating the at least one glass sheet to its heat softening temperature, transferring the heat softened glass sheet onto a heat resistant deformable fabric, wherein the glass sheet sags to a preliminary configuration, and conveying the glass sheet between the upper mold and the chamber, and moving the chamber upward to contact the fabric and press the glass sheet against the upper mold.

25. The method as in claim 23, wherein moving the upper mold and the lower mold comprises supporting the at least one glass sheet on a heat resistant flexible fabric supported on a conveying frame, moving the at least one sheet and support frame through a furnace to heat the at least glass sheet to its heat softenable temperature, wherein the at least one glass sheet sags by gravity to a preliminary configuration; and aligning the preliminarily shaped at least one glass sheet on the support frame between the upper mold and the chamber, and moving the chamber upward to contact the fabric and press the at least one glass sheet against the upper mold.

26. The method as in claim 17, further comprising providing a static pressure within the chamber of no greater than 1.5 psi.

27. The method as in claim 17, wherein the at least one preliminary shaped heat softened glass sheet is a doublet for a windshield.

28. An apparatus for shaping at least one heat softened glass sheet comprising:

an upper mold comprising a full surface press face having a shaping surface generally contoured to the desired curvature of at least one preliminarily shaped glass sheet:

a heat resistant flexible carrier positioned on a support frame to support the at least one glass sheet below the upper mold;

a chamber positioned below the heat resistant flexible carrier, the chamber comprising a shaping rail having an upper glass sheet supporting surface that supports selected peripheral portions of the at least one class sheet, the sheet supporting surface having a profile generally corresponding to desired elevational contours of the selected peripheral portions of the at least one glass sheet and generally complimenting corresponding portions of the upper mold shaping surface:

a moving device comprising a lifting frame to move the chamber upward against the flexible carrier such that the selected peripheral portions of the at least one glass sheet are pressed between the shaping rail of the chamber and the corresponding portions of the upper mold, and a connector to direct pressurized gas into the chamber to urge at least central portions of the at least one glass sheet towards the upper mold press face.

29. An apparatus for shaping at least one heat softened glass sheet comprising:

an upper mold comprising a full surface press face having a shaping surface generally contoured to the desired curvature of at least one preliminarily shaped class sheet;

a heat resistant flexible carrier positioned on a support frame, wherein the flexible carrier comprises a heat resistant, flexible fabric suspended between generally horizontally extending support members to form a hammock arrangement, a plurality of posts to support the members and a pair of rails to support the posts;

a chamber positioned below the flexible carrier to support the at least one glass sheet below the upper mold positioned below the at least one glass sheet, the chamber comprising a shaping rail having an upper glass sheet supporting surface that supports selected peripheral portions of the at least one glass sheet, the sheet supporting surface having a profile generally corresponding to desired elevational contours of the selected peripheral portions of the at least one glass sheet and generally complimenting corresponding portions of the upper mold shaping surface;

a moving device to move the upper mold and the shaping rail relative to each other so as to press at least a periphery of the at least one glass sheet against the upper mold shaping surface, and a connector to direct pressurized gas into the chamber to urge at least central portions of the at least one glass sheet towards the upper mold press face.

* * * * *